Nov. 8, 1927. 1,648,829
F. L. SESSIONS
FLYING SHEARS
Filed Sept. 29, 1924   9 Sheets-Sheet 4

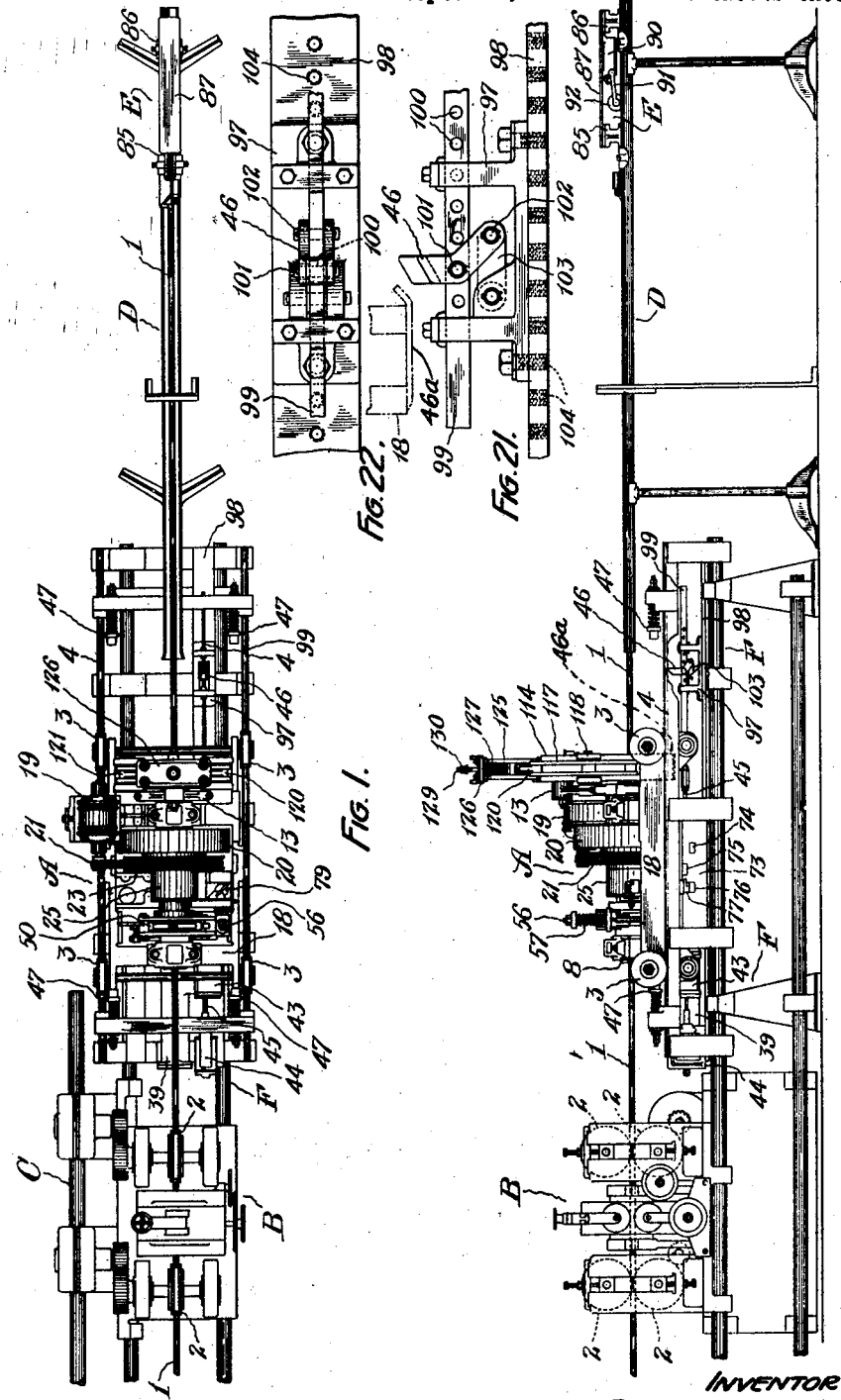

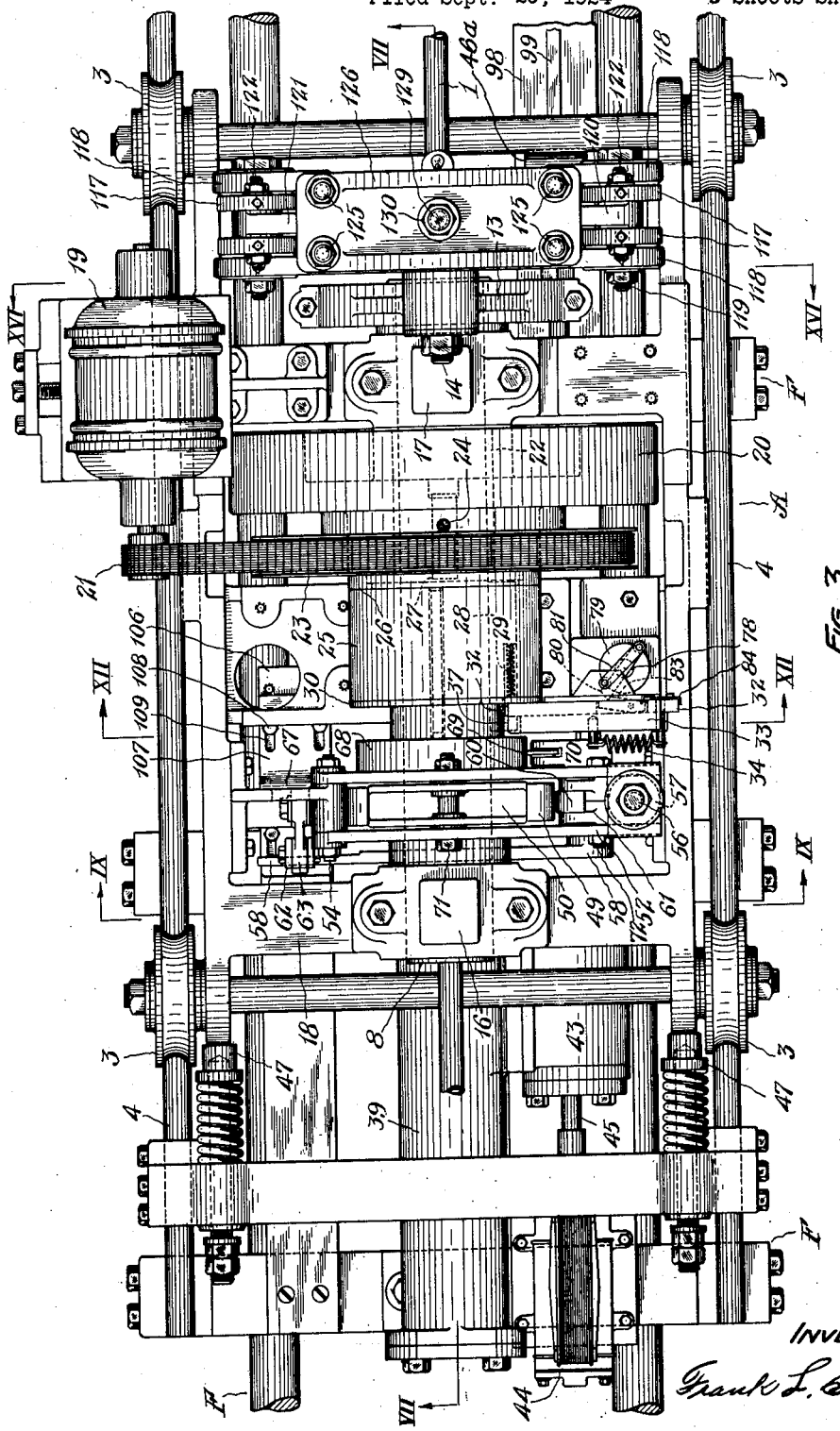

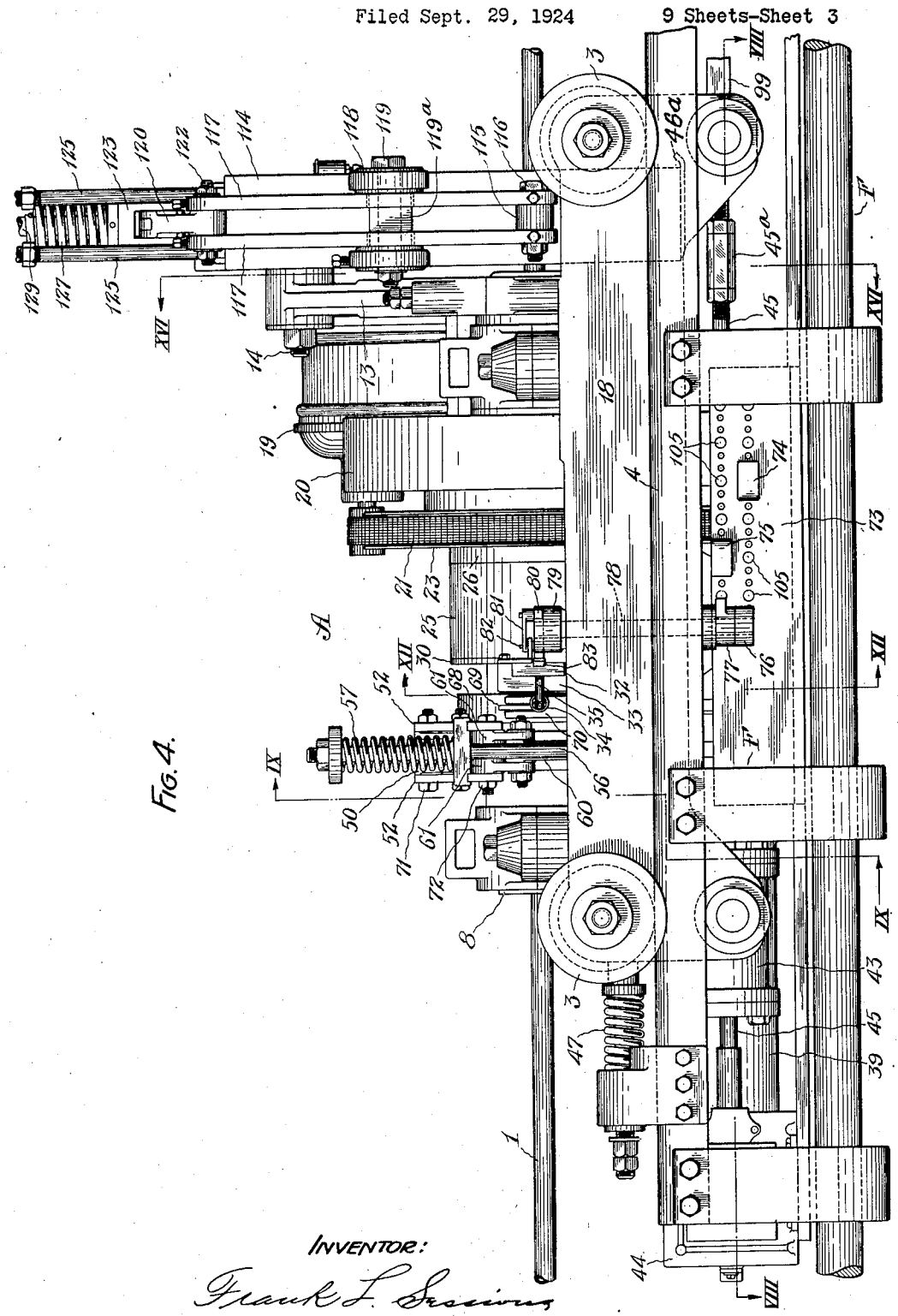

INVENTOR:
Frank L. Sessions

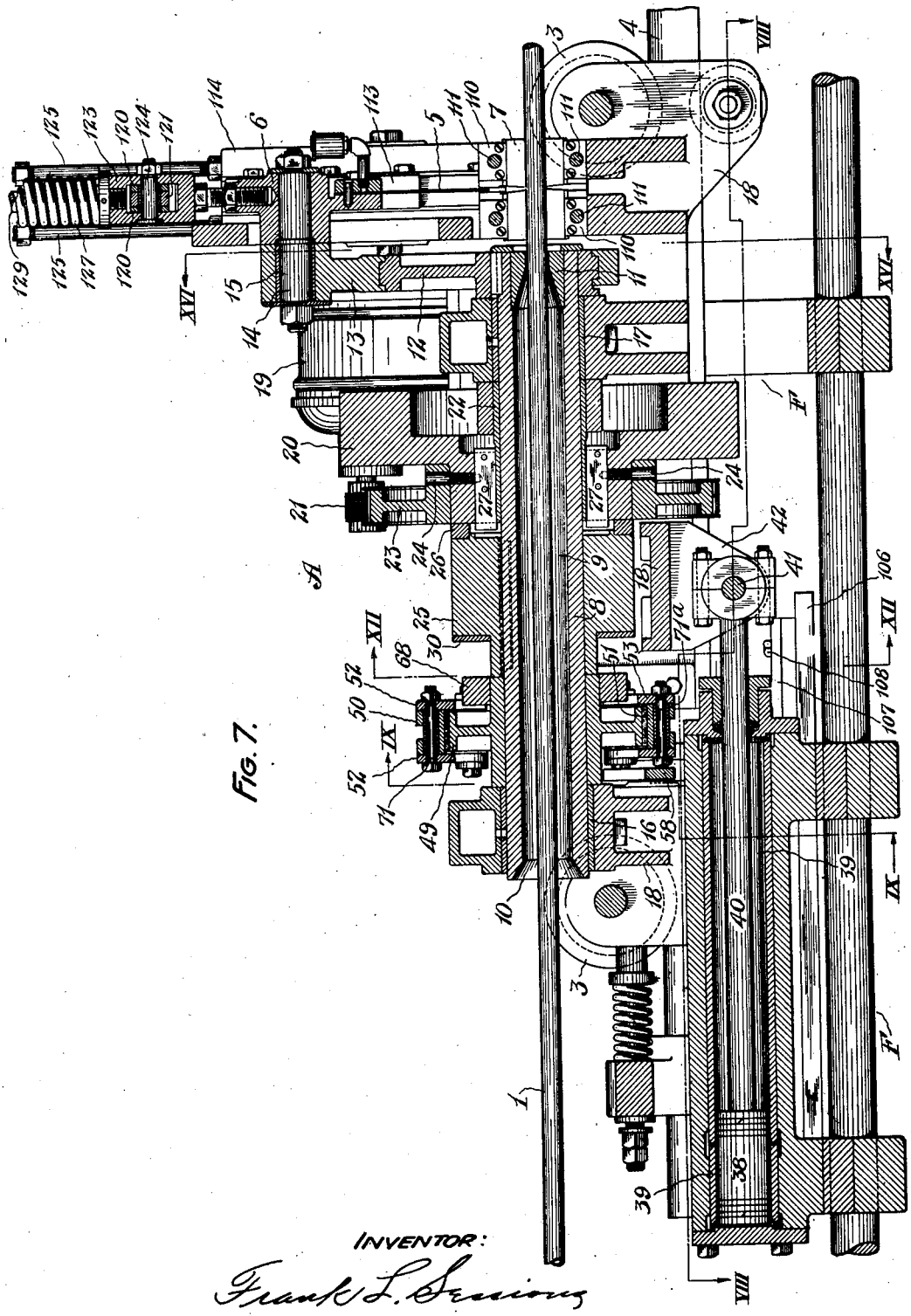

Nov. 8, 1927.

F. L. SESSIONS

FLYING-SHEARS

Filed Sept. 29, 1924

INVENTOR:
Frank L. Sessions

Nov. 8, 1927. 1,648,829
F. L. SESSIONS
FLYING SHEARS
Filed Sept. 29, 1924 9 Sheets-Sheet 7

INVENTOR:
Frank L. Sessions

Nov. 8, 1927.  1,648,829
F. L. SESSIONS
FLYING SHEARS
Filed Sept. 29, 1924  9 Sheets-Sheet 8
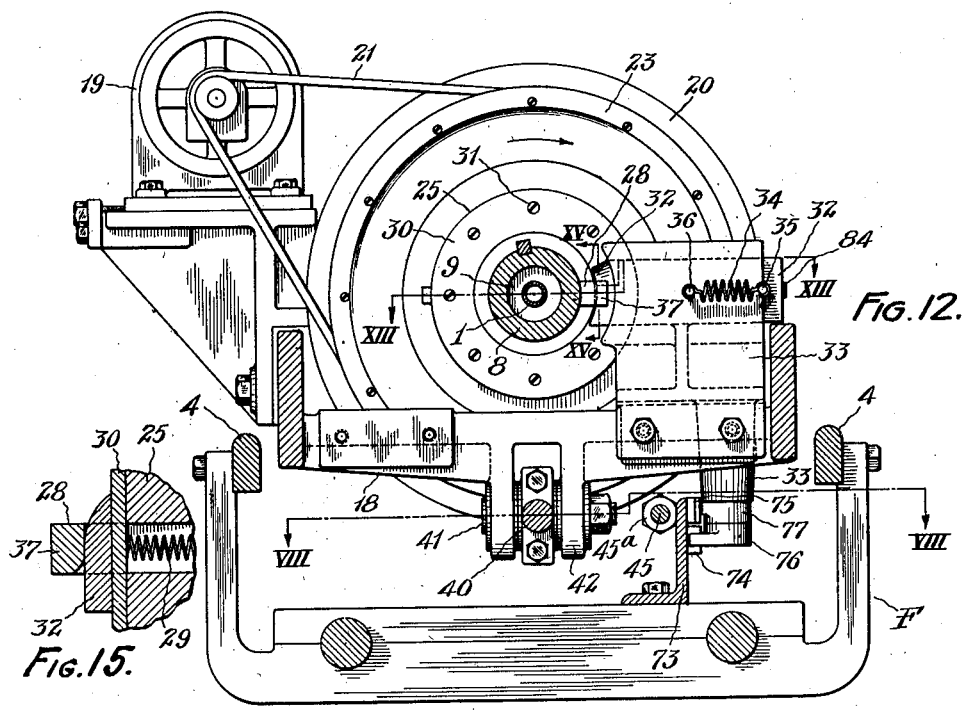
FIG. 12.
FIG. 15.
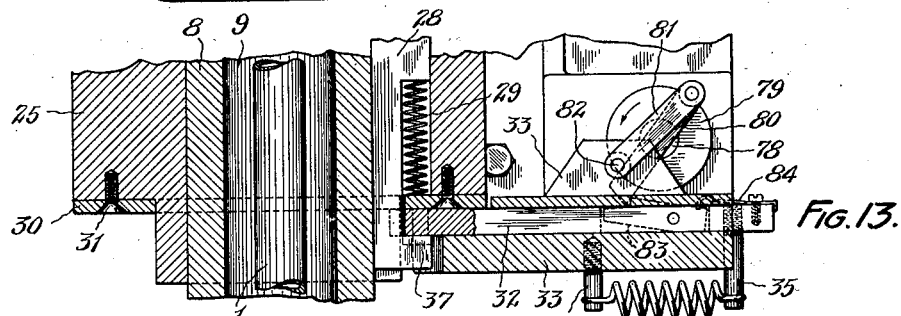
FIG. 13.
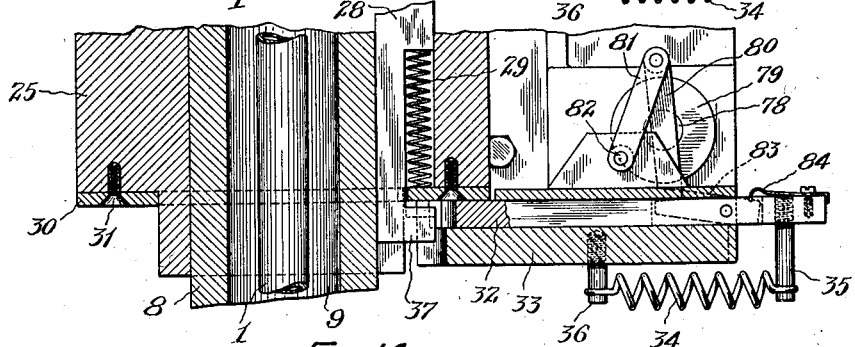
FIG. 14.
INVENTOR:
Frank L. Sessions

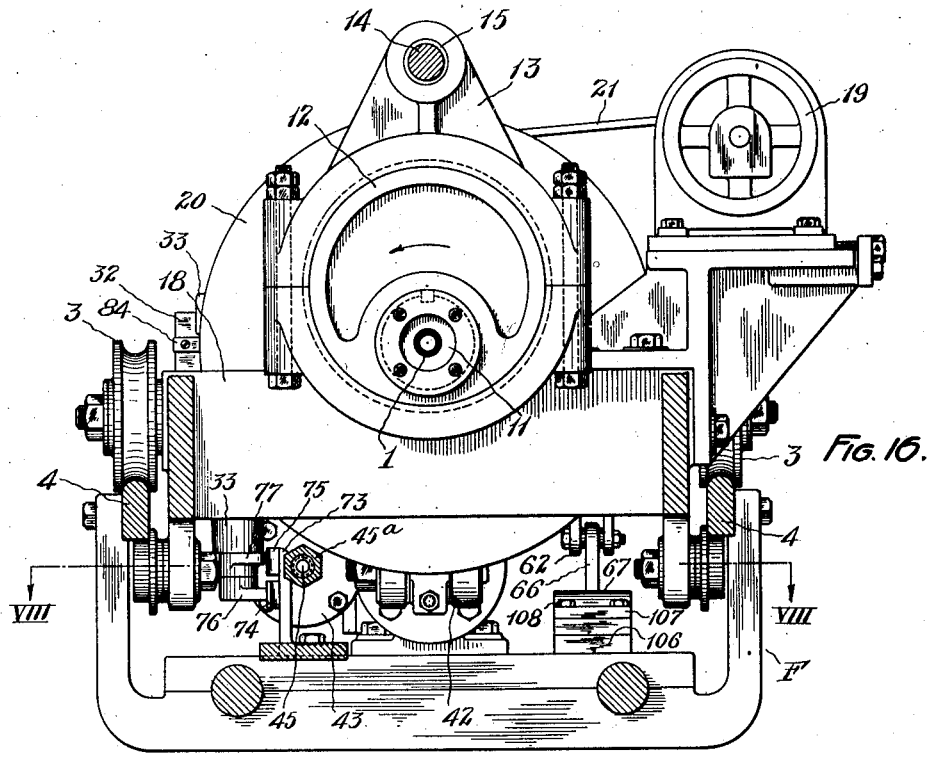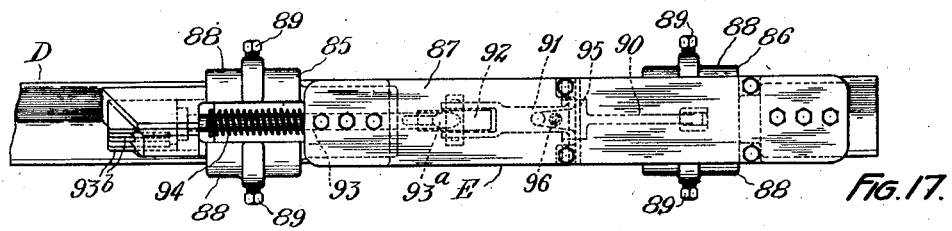

Patented Nov. 8, 1927.

1,648,829

UNITED STATES PATENT OFFICE.

FRANK L. SESSIONS, OF LAKEWOOD, OHIO, ASSIGNOR TO THE ELYRIA IRON AND STEEL COMPANY, OF CLEVELAND, OHIO, A CORPORATION OF OHIO.

FLYING SHEARS.

Application filed September 29, 1924. Serial No. 740,595.

My invention is particularly adapted for use in connection with continuous, high speed, tube forming or tube forming and welding machines to cut the tube automatically into measured lengths as it continuously emerges from the machine without stopping or retarding the progress of the tube through the machine. It may be applied to such a tube welding machine as that shown in my co-pending application Serial Number 590,884, filed Sept. 27, 1922. In the drawings accompanying this specification my invention is shown mounted at the delivery end of such a machine as is shown in that application.

The principal object of my invention is to provide an automatic flying-shear or cutting-off device for severing continuously-fed, lineal tube into measured lengths when the tube is moving at relatively high speed. Another object is to provide an apparatus which is adapted to sever lineal tube into measured lengths without stopping or retarding the speed of travel of the tube when the tube is traveling at any speed at which it may be formed or welded. A further object of my invention is to provide a flying shear in which the center of gravity of the moving parts, that is to say of the parts of the flying shear which are put into motion and travel along with the tube during the cutting off operation, is substantially in the line of travel of the tube and substantially in the plane of support of the moving parts. In flying shears with which I am familiar and which have been adapted to cut off tubing while in motion I have observed that when the center of gravity of the machine is not substantially in the line of travel of the tube and not in the plane of the support of the moving parts the whole structure is subjected to severe and injurious shocks when it is being started and stopped. As the cutting off operations must take place regularly between short intervals of time these repeated shocks cause rapid deterioration and costly upkeep of the machine and frequently cause damaged output.

My invention is aimed to overcome these objections and to accomplish the desirable disposition of the weight of the moving parts I provide among other improvements a punch press having a hollow crank-shaft through which the tube to be severed passes longitudinally.

In the accompanying drawings Fig. 1 is a plan view of the flying shear mounted upon the end of a tube forming or a tube forming and welding machine;

Fig. 2 is a side elevation of the apparatus shown in Fig. 1 having a small section broken away to disclose the valve trip lever for shifting the air valve to reverse the movement of the flying shear after the cutting-off operation;

Fig. 3 is a top plan view of the flying shear or cutting-off device drawn to a larger scale than Figs. 1 and 2;

Fig. 4 is a side elevation of the apparatus shown in Fig. 3;

Fig. 7 is a vertical, longitudinal section on line VII—VII of Fig. 5;

Fig. 12 is a section on line XII—XII of Fig. 4;

Fig. 13 is a section on line XIII—XIII of Fig. 12, enlarged;

Fig. 14 is a section similar to Fig. 13 but showing the lock bolt in released position;

Fig. 15 is a section drawn to a larger scale on line XV—XV of Fig. 12;

Fig. 16 is a section on line XVI—XVI of Figs. 3, 7 and 8;

Fig. 17 is a top plan view of the electric contact device;

Fig. 18 is a side elevation of the electric contact device shown in Fig. 17;

Fig. 19 is a section on line XIX—XIX of Fig. 18;

Fig. 20 is a section on line XX—XX of Fig. 18;

Fig. 21 is a side elevation of the air valve trip lever construction;

Fig. 22 is a plan view of the air valve trip lever construction;

Fig. 24 is a section on line XXIV—XXIV of Fig. 5.

In Figs. 1 and 2 of the drawings which show respectively a plan and side elevation of my invention mounted upon the delivery end of a tube forming or a tube forming and welding machine, A designates the flying shear; B designates the tube feeding mechanism which, as shown, consists of a set of tube straightening rolls which are power driven by means of suitable gearing from the main drive shaft, C, of the tube forming or tube forming and welding machine; D designates a guide conveniently formed of a structural angle, which supports the tube as it emerges from the flying shear and is of sufficient length to accommodate the longest tube. E is an electric contact device which is secured adjustably upon the angle guide, D, and is adapted to be set in the position required to measure the length of the tube which is to be cut off. The flying shear, A, is shown mounted to travel upon the frame, F, of the tube forming or tube forming and welding machine but it will be understood that the flying shear may be mounted upon an independent supporting structure and the tube may be fed to it from any source and in any suitable manner.

The tube which is to be cut into measured lengths is shown at 1. It may be fed forward by means of the straightening rolls, 2—2, or other suitable feed rolls, the movement, which may be continuous, being from left to right as shown in Figs. 1 and 2.

When the leading end of the moving tube, 1, strikes the electric contact device, E, it causes an electric circuit to be closed through a solenoid which operates a valve to admit compressed air into a cylinder behind a piston which propels the flying shear, A, upon its forward traversing movement with the tube. By suitable mechanism which will be described, the flying shear is operated and the tube is severed while they are traveling at the same speed. The flying shear is then returned by compressed air to the starting position in Figs. 1 and 2. The tube, 1, may be fed continuously through the flying shear and measured lengths cut off in succession as the end of the tube engages the electric contact device, E. The cut-off lengths of tube are successively pushed out of the guide, D, by the oncoming tube.

The flying shear, A, is provided with truck wheels, 3—3, which are adapted to roll on the rails, 4, which are secured to and supported by the frame, F, or other suitable support. It will be observed that by passing the tube through the hollow crank-shaft of the punch-press which constitutes the tube cutting off mechanisms, it is possible to keep the center of gravity of the moving parts substantially in the plane of support.

Figure 6:
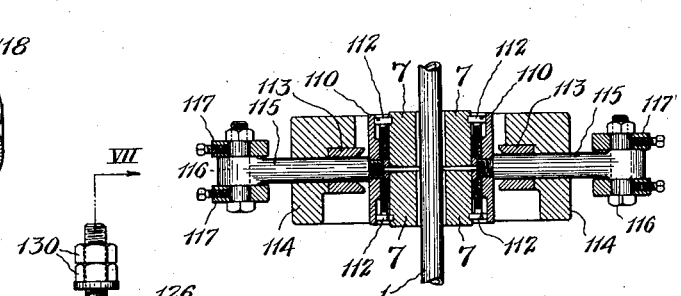
Fig. 6 is a section on line VI—VI of Fig. 5.
Figure 5:
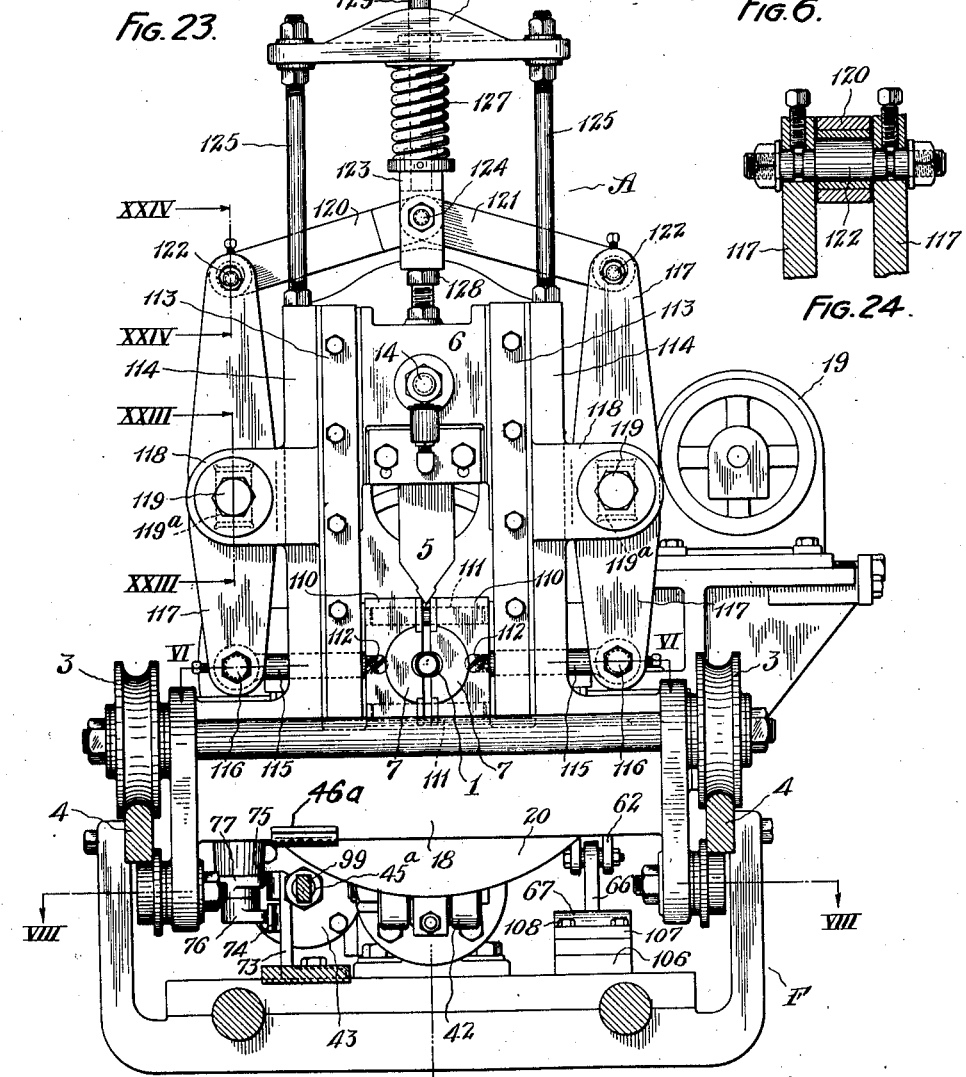
Fig. 5 is a front or delivery end elevation of the cutting-off device shown in Fig. 4.

I prefer to sever the tube by means of a blade, 5, of known construction which is secured to the plunger, 6, of the punch-press portion of the flying shear. The blade, 5, plunger, 6, and the clamping dies, 7, 7, are best seen in Figs. 5, 6 and 7, Sheets 4 and 5 of the drawings. As the blade, 5, starts downward, propelled by the plunger, 6, the dies, 7—7, are automatically closed about the tube and firmly engage it so as to insure that the flying shear has the same speed of travel as the tube and also to properly support the tube for the blade, 5, to pass through it. The punch-press which drives the plunger, 6, and blade, 5, in their vertical movements is designed to make a single stroke downward and return to the upper limit of its travel during one cycle of movement of the flying-shear forward to sever the tube and backward to its starting position.

I prefer to construct the punch-press with a hollow crank-shaft, 8, the longitudinal aperture through the shaft being shown at 9. The end of the shaft, 8, where the tube enters is bell-mouthed as shown at 10. At the other end of the crank shaft, 8, a bushing, 11, also having a bell-mouth may be provided to guide the tube into the dies, 7. The bushing, 11, is made so that it may be readily removed and replaced by a bushing of proper size to guide another size of tube.

Upon the end of crank shaft, 8, adjacent the dies, 7, is secured the crank, 12. As the shaft, 8, is of relatively large diameter I prefer to make the crank, 12, in the form of an eccentric disc as shown in Fig. 16. The connecting rod, 13, is mounted upon the crank, 12, and is provided with a suitable aperture for the reception of the plunger or cross-head pin, 14. One end of the cross-head pin, 14, is carried in an aperture in the plunger, 6. I prefer that pin, 14, be secured rigidly to the plunger, 6, and that it be permitted to rotate in a suitable bearing bushing, 15, in the connecting rod, 13. The crank shaft, 8, is supported for rotation in suitable pedestal bearings, 16 and 17, which are part of or are mounted upon the punch-press frame, 18.

A motor, 19, suitably mounted upon frame, 18, may be provided for driving the fly-wheel of the punch-press continuously so long as the machine is to be operated. In the drawings the motor is shown connected to drive the fly-wheel, 20, of the punch-press by means of the chain belt, 21. The fly-wheel, 20, is mounted for free rotation upon the shaft, 8, and a bearing bushing, 22, may be provided in the bore of the fly-wheel. Any well known means may be provided for lubricating this bearing.

I prefer to make the sprocket wheel, 23, which receives the chain, 21, from the motor, 19, separate from the fly-wheel. This sprocket wheel is shown in section in Fig. 7 mounted upon the hub of fly-wheel, 20, and secured thereto against rotation and also against longitudinal displacement by means of driving pins, 24. A driving collar, 25, is mounted upon shaft, 8, and rigidly secured thereto. It is spaced from the hub of fly wheel, 20, by the spacing ring, 26, forming an annular space between the end of the fly wheel hub and the end of the driving collar. Driving projections are provided upon the face of the fly-wheel hub and project into this annular space. These driving projections are preferably the ends of steel keys, 27, secured in apertures in the fly wheel hub with their ends projecting to engage the striker, 28, to rotate the crank shaft to operate the punch-press. The collar, 25, is provided with a key-way or aperture in which the striker or driving key, 28, is slidably mounted. One side of this striker is cut away to form a shouldered recess for the reception of a spring, 29. A plate, 30, secured to the end of collar, 25, by screws, 31, enters the spring recess to form an abutment for one end of the spring, 29, the other end of which abuts against the sliding key or striker, 28. It will be seen that the striker, 28, is normally held pushed toward the fly-wheel, 20, by the spring, 29.

A sliding bolt, 32, is provided having a support in a bracket, 33, which may be attached to or form a part of frame, 18. A spring, 34, secured at one end to a pin, 35, which is secured to the sliding bolt, 32, and at the other end to a pin, 36, which is secured in the bracket, 33, acts to hold the bolt, 32, in its innermost position. The sliding bolt, 32, (Fig. 15, Sheet 8), is bevelled circumferentially and the adjacent inwardly facing side of the projection, 37, of striker, 28, is correspondingly bevelled so that upon rotation of the shaft, the bevelled sliding bolt will engage the bevelled end of the striker and withdraw it out of its range of contact with the driving projections, 27, of the fly-wheel. The driving connection between the fly-wheel and the crank shaft is thus disconnected and by suitable braking mechanism the crank shaft is brought to rest.

The keys, 27, are secured against endwise displacement by the ends of driving pins, 24, which, as seen in Fig. 7, Sheet 5, project into suitable recesses in the keys, 27.

A double acting piston, 38, is provided which is fitted to operate in an air cylinder, 39. A piston rod, 40, extends outwardly from the piston, 38, and is connected by the pin, 41, to a depending bracket, 42, of the punch press frame, 18. The piston, 38, and piston rod, 40, are preferably located directly under the center line of the crank shaft, 8, and, preferably, the piston rod is connected to the punch-press frame as near as possible to the center of the crank shaft, 8. This is in order that the force of the piston may be exerted as nearly as possible on a line passing through the center of gravity of the flying shear structure. The cylinder, 39, is secured to the stationary frame, F, and virtually is a part of it.

Figure 8:
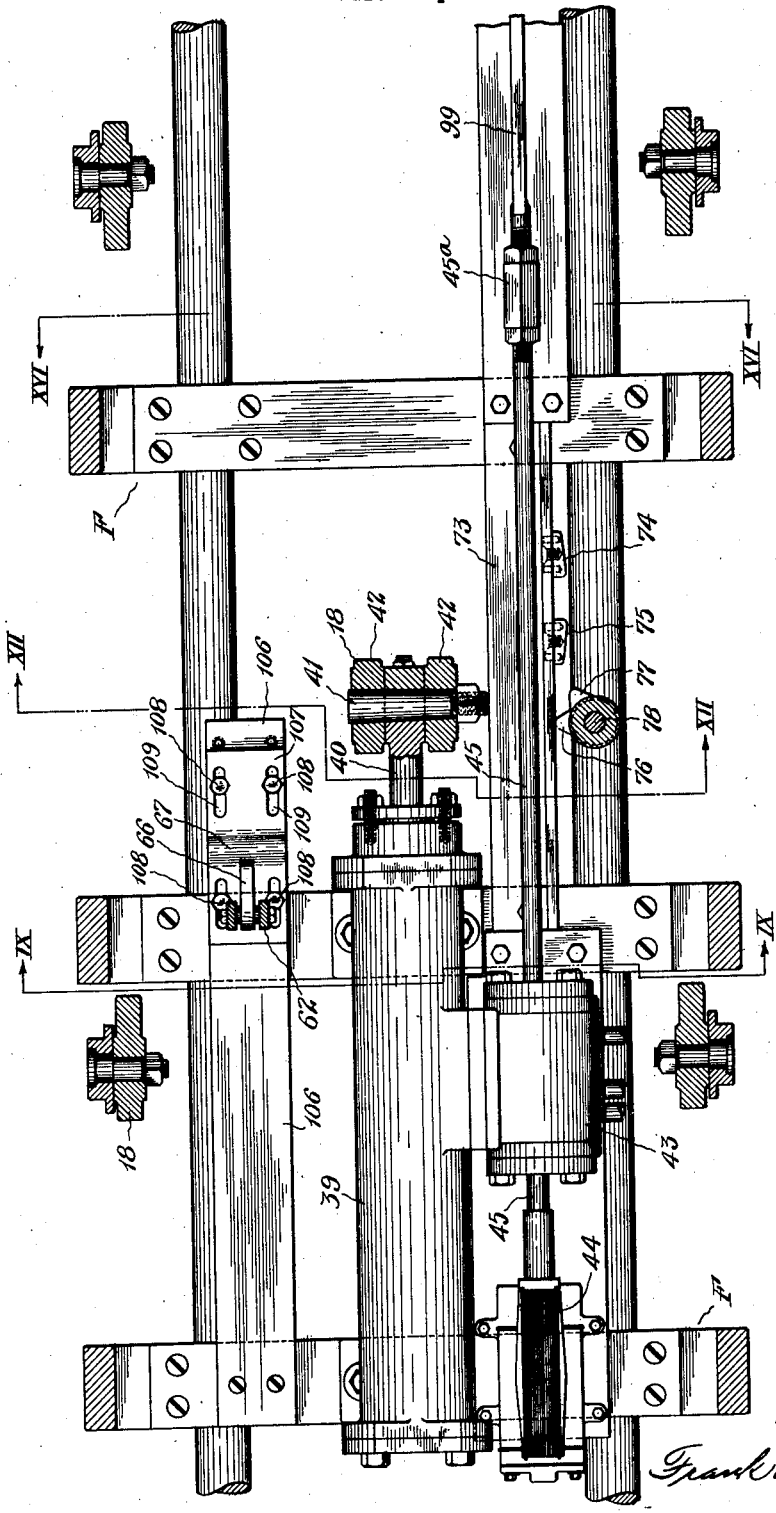
Fig. 8 is a section on line VIII—VIII of Figs. 4 and 7.

Air is admitted to the cylinder, 39, through a slide valve of known construction (not shown) which is enclosed in the valve chest, 43, (Fig. 8, Sheet 6). An electromagnetic solenoid, 44, is provided for operating the air valve for admitting air into the cylinder, 39, behind piston, 38, to move the flying shear in its forward traversing movement with the tube. The valve rod, 45, has an adjustable portion which extends forward and has adjustably secured to it a trip lever, 46 (Fig. 2, Sheet 1), which is engaged by the punch-press frame at the proper point in its forward travel, after the press has made its cutting-off stroke, to shift the valve so as to stop the admission of air behind the piston, 38, and admit it into the cylinder in front of the piston. By the same movement of the valve an exhaust port from the rear end of cylinder, 39, is opened and the air which drove the piston forward is permitted to escape from the rear end of the cylinder while the compressed air entering the front end of the cylinder pushes the piston backward and returns the punch-press to its starting position.

A wearing plate or bumper, 46ª, shown in Figs. 2, 3 and 5 and in dotted lines in Fig. 21, may be secured to the forward, bottom edge of frame 18, for engaging lever, 46.

Shock absorbers or bumpers, 47, are provided to cushion the punch-press both on the forward and backward movements.

Figure 9:
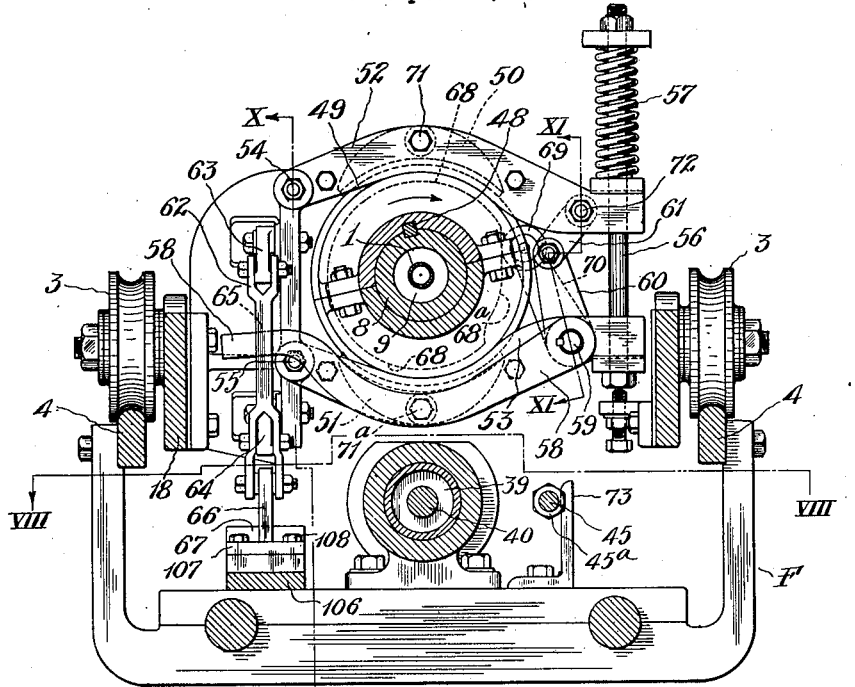
Fig. 9 is a section on line IX—IX of Fig. 7.

Secured to crank-shaft, 8, by means of a key, 48, or other suitable driving connection, is a brake drum, 49. A pair of brake shoes, 50 and 51, held by levers, 52 and 53, are adapted to be applied to the brake drum, 49. Levers, 52 and 53 are fulcrumed at 54 and 55 to the frame, 18, at one side of brake drum, 49, and their other ends are connected by a rod, 56, which passes through apertures in the ends of the levers and carries a spring, 57, which is adapted to yieldingly press upon one of the levers and draw the other lever towards it by means of the rod, 56, (Fig. 9, Sheet 7). The brake shoes, 50 and 51, are thus normally applied to the drum, 49.

A brake releasing lever, 58, is provided. It is mounted upon and keyed to a shaft, 59, rotatably mounted in an aperture at one end of the lower brake lever, 53. A short lever, 60, also keyed to shaft, 59, forms one member and a link, 61, forms the other member of a toggle which is adapted to separate the ends of levers, 52 and 53. To release the brake, the lever, 58, is operated to rotate the shaft, 59, to cause the toggle links to separate the ends of the brake levers and raise the brake shoes from contact with the brake drum.

Figure 10:
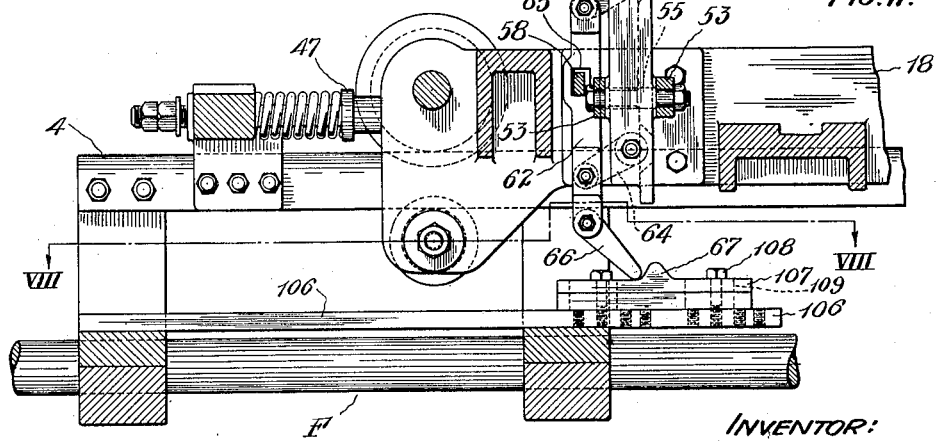
Fig. 10 is a section on line X—X of Fig. 9.

Lever, 58, is operated automatically by movement of the punch-press forward. The mechanism which operates it is shown in Figs. 9 and 10, Sheet 7. In the frame, 18, of the punch-press there is mounted for vertical movement, a bar or latch, 62, by means of a pair of pivoted links, 63 and 64. Bar, 62, is provided with a slot, 65, through which the lever, 58, passes. To the lower end of bar, 62, is pivoted a finger, 66, which is adapted to engage a lug, 67, adjustably secured to the stationary frame, F. As the punch-press starts forward upon its forward travel with the tube, the finger, 66, engages projection, 67, and the bar, 62, is thereby raised thus raising the end of lever, 58, to release the brake. As soon as the crank shaft starts to rotate, a cam, 68, which is mounted upon or forms part of the brake drum, 49, and which has a dwell portion forming a large part of its circumference rotates under roller, 69, which is carried by lever, 70, which is keyed to shaft, 59. The brake is thus held released until roller, 69, comes to the depressed portion, 68ª, of the cam surface shown in dotted lines in Fig. 9, Sheet 7. As the press continues in its forward movement, finger, 66, passes over lug, 67, and is loosely suspended from the bar, 62, during the remainder of the forward and backward movement of the press. As the crank shaft, 8, is nearing the end of a revolution the striker, 28, is withdrawn by bolt, 32, from contact with driving projection, 27, and the cam-lift roller, 69, enters the depression, 68ª, in the cam surface and permits the brake shoes, 50 and 51, to be applied by spring, 57. As the press returns to its starting position the finger, 66, which actuates bar, 62, again drops back of lug, 67, (Fig. 10, Sheet 7).

The brake releasing mechanism just described operates to lift the brake shoes from drum, 49, before the crank-shaft, 8, starts to rotate. The brake is therefore always released and the crank-shaft is free to rotate before the striker, 28, engages one of the driving projections, 27, of fly wheel, 20.

Figure 11:
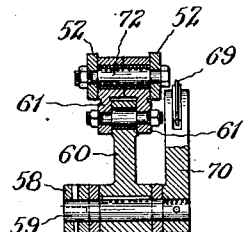
Fig. 11 is a section on line XI—XI of Fig. 9.

In Figs. 9, 10 and 11, Sheet 7, it will be seen that each of the brake levers, 52 and 53, is composed of a pair of spaced-apart bars, between which the brake shoes, 50 and 51, are respectively mounted on transverse pins, 71 and 71ª, respectively. The toggle-link, 61, is mounted upon a transverse pin, 72, secured to the upper brake shoe lever, 52.

The means for withdrawing the sliding bolt, 32, and releasing the striker, 28, so that it may engage one of the projections, 27, upon the fly wheel, 20, is seen in Fig. 5 Sheet 4; Fig. 8 Sheet 6; and Figs. 12, 13 and 14, Sheet 8. To the member, 73, of the stationary frame, F, there are secured a pair of projecting lugs, 74 and 75, which are adapted to engage the ends of levers or star wheel teeth, 76 and 77, which are keyed or otherwise secured to a vertical shaft, 78, which is rotatably mounted in bearings in bracket, 33. At the upper end of this vertical shaft, 78, there is a flanged head, 79, which has a transverse slot in which there is a sliding trigger, 80. A link, 81, connects one end of this trigger to the bracket, 33, by a pivoted connection, 82. Rotation of shaft, 78, causes the trigger, 80, to slide in the slot in the shaft head, 79.

The sliding bolt, 32, is slotted at one end and in the slot there is pivoted a pawl 83, seen in Figs. 13 and 14. Pawl, 83, is notched near one end and the shoulder thus formed is adapted to be engaged by the corresponding end of trigger, 80. A spring, 84, which is secured to sliding bolt, 32, presses upon one end of pawl, 83, and yieldingly holds it in position to be engaged by trigger, 80.

The lug, 74, is so located that the star wheel tooth, 76, does not engage it upon the forward movement of the press until the brake shoes, 50 and 51, have been released. As the press moves forward star wheel tooth, 76, strikes lug, 74, the shaft, 78, is rotated in the direction shown by the arrow in Fig. 13 and trigger, 80, pushes back the sliding bolt, 32, and releases the striker, 28. Shaft, 78, is rotated far enough by star wheel tooth, 76, to cause the trigger, 80, to be disengaged from the pawl, 83, and sliding bolt, 32, is immediately returned by spring, 34. Fig. 14 shows the trigger at the point of releasing the pawl.

The rotation of the shaft, 78, during the forward movement of the punch-press also places star wheel tooth, 77, in position to be engaged by lug, 75. Upon the return movement of the punch-press, the shaft is therefore rotated in the opposite direction from that indicated by the arrow in Fig. 13, and trigger, 80, is thereby returned into the position shown in Fig. 13, the spring, 84, yielding to permit the trigger to depress pawl, 83, and pass over it into engagement with its shoulder.

As soon as trigger, 80, has withdrawn the sliding lock bolt, 32, from its engagement with striker, 28, the latter is moved by spring, 29, into position to be engaged by one of the driving projections, 27, of flywheel, 20, and when this engagement occurs the crank-shaft starts to rotate. As the shaft, 8, approaches the end of a revolution, the bevelled surface of the sliding bolt, 32, engages projection, 37, of the striker, 28, and withdraws it from its driving engagement with the fly-wheel thus permitting the brakes to bring the shaft to rest with the plunger, 6, at the top of its stroke.

The electric contact making device shown in Figs. 17, 18, 19 and 20, Sheet 9, comprises a supporting frame built up of two pedestals, 85 and 86, which are connected by a bar, 87. The pedestals, 85 and 86, have angularly depending side flanges, 88, which are adapted to encompass the flanges of the tube guide, D. Set screws, 89, may be employed to secure the device in adjusted position upon the guide, D.

An inclosed electric switch, 90, is supported upon the bar, 87, and is operated by the movement of a lever, 91. The lever, 91, carries at its outer end a roller, 92, which is adapted to be engaged by a plunger, 93. The plunger, 93, is slidably mounted in the forward pedestal, 85, and is normally held in the position shown in Fig. 17, by the spring, 94. One end of plunger, 93, is laminated and extends through slots in the end of pedestal, 85. This end of pedestal, 85, is bevelled so that when the end of the tube engages the laminated projecting portion or anvil 93$^b$ of plunger, 93, and pushes the plunger back to close the electric switch, 90, the end of the tube is pushed to one side and out of guide, D.

The rear end of plunger, 93, is bevelled at 93$^a$ for engaging roller, 92. When the plunger is pushed backward by the tube the roller is lifted; the lever, 91, is rotated about its fulcrum, 95; and the switch, 90, is closed thereby permitting electric current to pass through the solenoid, 44, and move the valve of the air cylinder to admit air into the cylinder, 39, back of piston, 38, and start the cutting-off press upon its forward movement.

The object of laminating the end of plunger, 93, is to avoid the necessity for making a round hole in the end of pedestal, 85, which is bevelled to deflect the tube. If a round hole were made in the end of the pedestal through the bevelled surface the end of the tube might catch upon the edges of the hole or a small tube might enter the hole and the tube would not be deflected out of the guide, D. The width of the slots for the laminated end, 93$^b$, of the plunger, 93, should be less than the diameter of the smallest tube which is to be handled by the machine.

A small forward movement of the leading end of the tube suffices to deflect it out of contact with the end of plunger, 93, which is then returned to its normal position by spring, 94, and the switch, 90, is opened by spring, 96, assisted by the weight or roller, 92. The opening of switch 90, should occur before the punch-press frame engages valve trip lever, 46, to shift the valve to admit air to the cylinder, 39, for returning the punch-press.

As soon as a length of tube has been cut off by the flying shear the oncoming tube pushes the cut-off piece ahead and by this movement its leading end is pushed off from guide, D, until the unsupported end overbalances that part of the tube which is in the guide and the severed length of tube falls off to one side of the guide to be disposed of as desired.

The air valve reversing mechanism of which valve trip lever, 46, is a part comprises an adjustable support, 97, which is mounted upon a plate, 98, secured to the frame, F. The support, 97, has two upright portions which are slotted to form a guide for an extension, 99, of valve rod, 45. Preferably valve rod extension 99, is a rectangular bar having a series of apertures, 100, which are spaced apart and adapted to receive the fulcrum pin, 101, of trip lever, 46. The upper end of trip lever, 46, is adapted to be engaged by the punch-press frame, 18, and the lower end is pivoted at 102 to a link, 103, which in turn is pivoted to the support, 97. The plate, 98, has a series of holes, 104, for receiving the screws which secure the support, 97, to it. It will be seen that the support 97, may be secured to the plate, 98, in as many different positions as there are sets of threaded holes in plate, 98. In addition to this adjustment the series of apertures, 100, in the valve rod extension, 99, permit a still further adjustment of the position of valve trip lever, 46, relative to the longitudinal travel of the punch-press, and a turn buckle, 45$^a$, Fig. 8, Sheet 6, affords still closer adjustments.

Lugs, 74 and 75, for engaging the star wheel teeth which rotate shaft, 78, to withdraw the sliding bolt, 32, and return the trigger, 80, into operative position respectively, are adjustable longitudinally of the travel of the punch-press by means of perforations, 105, which are adapted to receive the screws which secure the lugs, 74, and 75, to the angle member, 73, of the frame, F. The series of holes, 105, are shown in Fig. 4 and the adjustment of the lugs, 74 and 75, may be easily understood from this figure. By adjusting the position of lug, 74, the starting of the crank shaft into rotation may be made to occur at any point found desirable. This will differ somewhat with the air pressure which actuates the punch-press in its traversing movement as well as with the speed of travel of the tubing which is to be cut off. It will be understood that it is desirable that the speed of travel of the punch press be substantially equal to that of the speed of travel of the tube at the instant when the dies, 7, close upon the tube. A slight variation in the relative speed of travel of the tube and of the punch-press is not detrimental although the ideal condition is that in which the tube and the punch-press are traveling at the same speed when the dies, 7, close upon the tube.

In order to provide for the proper timing of the release of the brake shoes, 50 and 51, from drum, 49, the lug, 67, is provided with a base portion, 107, which is adjustably secured to a bar or plate, 106, which forms part of stationary frame, F. As seen in Fig. 8, Sheet 6, the base portion, 107, is provided with slots, 109, through which bolts, 108, pass and secure it to plate, 106, in an obviously adjustable manner.

It will be seen that with the adjustable features embodied in valve trip lever, 46, striker release mechanism including lugs, 74 and 75, and the brake releasing lug, 67, all of the timing functions of the device can be readily adjusted and controlled.

By careful adjustment of the position of the electric contact device lengths of tube can be cut off with sufficient uniformity for commercial purposes.

In Figs. 5, 6, 23 and 24, Sheet 4, the dies and the die operating mechanism are clearly shown. The cutting dies, 7, are made in four sections which are assembled and accurately positioned and held in a pair of die blocks, 110. The die blocks, 110, are doweled together by four dowels, 111, which are spaced apart longitudinally of the tube to not interfere with the blade, 5, or the die sections. The dies, 7, are secured in the die blocks, 110, by means of screws, 112, which are threaded into die blocks, 110, and their heads project into slots which are cut in the outer surfaces of the die sections. When the screws, 112, are turned in the threaded apertures in die blocks, 110, the dies, 7, are moved longitudinally of the tube and may be adjusted accurately.

Plunger, 6, is adapted to slide vertically between wearing guides, 113, which are secured to the upright standards, 114, which may be a part of or be secured to the frame, 18.

The die blocks, 110, are supported upon a finished surface upon frame, 18. They are free to have limited transverse movement relatively to the tube to permit of their closing upon the tube and opening to permit the tube to pass freely through the dies, 7.

The die blocks, 110, and dies, 7, are moved toward and away from each other by an arrangement of levers which will now be described. Shouldered eye bolts, 115, are screwed into die blocks, 110, and are slidably mounted in apertures in the standards, 114. Eye bolts, 115, are pivoted at 116, to the main, die-operating levers, 117. Levers, 117, are pivoted to projecting brackets, 118, of the standards, 114. The fulcrum pins, 119, for the main levers are secured against rotation in the brackets, 118, and are free to rotate in bearing blocks, 119ᵃ, which have limited vertical sliding movement in levers, 117. This sliding movement is necessary on account of the fact that eye bolts, 115, and pivot pin, 116, travel in straight lines transversely of the machine, as the dies are opened and closed, and consequently the levers, 117, must move up and down about their fulcrums, 119, in order to permit of this rectilinear motion of the eye bolts, 115.

The upper ends of levers, 117, are connected by a pair of toggle links, 120, 121. Levers, 117, are connected to toggle links, 120, 121, by pins, 122, of special construction. Each of these pins, as will be seen in Fig. 24, has the portion which fits into the lever, 117, eccentric to the portion which fits into the toggle link so that by rotating the pins, 122, the distance between the centers of the eyes of links, 120, and 121 may be varied and thereby the throw of the lower end of levers, 117, may be also varied. The other ends of links, 120 and 121 are connected to a spring plunger head, 123, by means of a pin, 124.

Extending upward from the frame standards, 114, are rods, 125, which are rigidly secured to the frame standards and form upward extensions thereof. The upper ends of rods, 125, are secured in a yoke, 126. Yoke 126, forms the upper abutment for a spring 127, which presses downward upon spring plunger head, 123, to force the toggle levers, 120, 121, outward against levers, 117.

A threaded adjusting screw, 128, is secured in a threaded aperture in the top of plunger, 6. The head of screw, 128, is adapted to engage spring plunger head, 123, upon the upward movement of the plunger, 6, and thereby cause toggle links, 120, 121, to draw the upper ends of levers, 117, toward each other and separate the die blocks, 110, and dies, 7. A plunger rod, 129, is attached to spring plunger head, 123, and extends upwardly through a guiding aperture in yoke, 126. The upper end of this plunger rod is threaded and carries nuts, 130, which may be adjusted upon the plunger rod.

As the punch-press plunger, 6, starts on its downward movement the screw, 128, is lowered and permits spring, 127, to push plunger head, 123, downward and thereby exert force upon the toggle links, 120 and 121. When the nuts, 130, contact with the top of yoke, 125, no further spreading movement of the links, 120, 121, can take place, consequently the inward movement of the dies, 7, is limited by the position of nuts, 130, on plunger rod, 129.

The point of the blade, 5, is normally sufficiently above the surface of the tube, 1, to permit the dies, 7, to be closed into firm engagement with the tube before the point of the blade starts to sever the tube. The dies, 7, are then held closed by levers, 117, and toggles, 120 and 121, by the force of spring, 127, until the plunger has risen to the point where the end of blade 5, is above the top of the tube, 1. At this point the head of bolt, 128, again engages plunger head, 123, and opens the dies, 7. Injury to the blade, 5, from movement of the tube in the dies while the blade is in the path of the tube is thus avoided.

Figure 23:
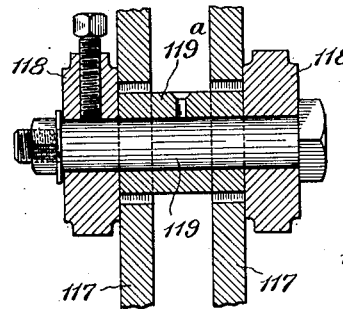
Fig. 23 is a section on line XXIII—XXIII of Fig. 5.

Fig. 23 shows details of construction of the fulcrum joints between the bracket, 118, and levers, 117.

Fig. 24 shows details of the eccentric pins which connect levers, 117, and toggle links 120 and 121.

In order that the various functions of the machine may be carried out efficiently and in proper sequence the machine is made to operate as follows: The forward end of the moving tube operates the electric contact device, E, and closes the circuit through the solenoid, 44, so that the valve in valve chest, 43, is operated to admit air behind piston, 38, and to open the exhaust outlet to the front end of cylinder, 39. This starts the punch-press on its forward travel. As the punch-press starts forward the brake shoes, 50 and 51 are first released from drum, 49, and thereafter the sliding bolt, 32, is withdrawn to permit the striker, 28, to be pushed into engaging position with projections, 27, by means of spring, 29. The engagement of one of projections, 27, with striker, 28, causes the crank shaft, 8, to be rotated by the fly wheel, 20, and motor, 19. The crank shaft makes a single revolution causing the plunger, 6, and blade, 5, to descend, cut-off the tube and return to the top of the stroke. As the crank-shaft nears the end of one revolution, the striker, 28, is withdrawn by engagement with the bevelled side of the bolt, 32, the brake shoes, 50 and 51, are automatically applied by spring, 57, when the depression in cam, 68, comes into position to permit roller, 69, to enter it; and the crank shaft is brought to rest, with the crank, 12, plunger, 6, and blade, 5, in their uppermost positions. During the first part of the downward movement of the plunger, the die, 7, is firmly closed on the tube by the spring, 127, before the point of the blade has reached the tube and the die remains closed in firm engagement with the tube until the blade has severed the tube and again risen to where its point clears the top and the tube and the spring 127 is compressed by the upward movement of plunger 6 and screw 128. The gripping of the die upon the tube insures that the punch-press and tube will be travelling at the same speed when the blade passes through the tube and further insures proper support for the cutting edges of the die against the metal of the tube adjacent the cutting edges of the blade.

After the tube has been severed the flying-shear continues to move forward until the bumper, 46ª, of frame 18, engages and operates the trip-lever 46, to shift the valve which controls the air that actuates piston, 38, so as to cut off the air from behind the piston, open the exhaust from that end of the cylinder and admit air in front of the piston to return the flying-shear back to its starting position. The rear bumpers, 47, arrest its backward movement, and it is held in its starting position by the air acting on the front end of piston, 38, until the solenoid, 44, is energized to admit air behind the piston to start the flying shear again on its cycle of operations. The forward bumpers, 47, assist in checking the forward movement of the flying-shear and absorb some of the shock due to the stopping and reversal of the heavy mechanism.

I claim:

1. Flying shear mechanism for severing travelling stock, comprising a base, a reciprocable carriage mounted thereon, a rotatable hollow shaft in said carriage surrounding the travelling stock, a shearing knife periodically actuated mounted on said carriage at the discharge end of said hollow shaft, and periodically actuated dies mounted on said carriage to engage said travelling stock and thereby insure synchronism in travel of carriage and stock.

2. Flying shear mechanism for severing travelling stock, comprising a base, a reciprocable carriage mounted thereon, a rotatable hollow shaft in said carriage surrounding the travelling stock, means for rotating said hollow shaft, a periodically actuated shearing knife mounted on said carriage, shearing knife actuating means periodically engaged by the rotation of said hollow shaft, periodically actuated dies mounted on said carriage to engage said travelling stock, and cooperating elements connecting said knife and dies.

3. Flying shear mechanism for severing travelling stock, comprising a base, a reciprocable carriage mounted thereon, a rotatable hollow shaft in said carriage surrounding the travelling stock, means for rotating said hollow shaft, a periodically actuated shearing knife mounted on said carriage, shearing knife actuating means periodically engaged by the rotation of said hollow shaft, periodically actuated dies mounted on said carriage to engage said travelling stock, cooperating elements connecting said knife and dies, and a prime mover to reciprocate said carriage.

4. Flying shear mechanism for severing travelling stock, comprising a base, a reciprocable carriage mounted thereon, a rotatable hollow shaft in said carriage surrounding the travelling stock, means for rotating said hollow shaft, a periodically actuated shearing knife mounted on said carriage, shearing knife actuating means periodically engaged by the rotation of said hollow shaft, periodically actuated dies mounted on said carriage to engage said travelling stock, cooperating elements connecting said knife and dies, a prime mover to reciprocate said carriage, and adjustable means to automatically control the operation of the prime mover.

5. Flying shear mechanism for severing travelling stock, comprising a base, a reciprocable carriage mounted thereon, a rotatable hollow shaft in said carriage surrounding the travelling stock, means for rotating said hollow shaft, a periodically actuated shearing knife mounted on said carriage, periodically actuated dies mounted on said carriage to engage said travelling stock, cooperating elements connecting said knife and dies, a prime mover to reciprocate said carriage, adjustable means to automatically control the operation of the prime mover, and a motor to actuate said shearing knife.

6. Flying shear mechanism for severing travelling stock, comprising a base, a reciprocable carriage mounted thereon, a rotatable hollow shaft in said carriage surrounding the travelling stock, means for rotating said hollow shaft, a periodically actuated shearing knife mounted on said carriage, periodically actuated dies mounted on said carriage to engage said travelling stock, cooperating elements connecting said knife and dies, a prime mover to reciprocate said carriage, adjustable means to automatically control the operation of the prime mover, a motor, and automatically controlled engaging devices to intermittently rotate the shaft by said motor.

7. Flying shear mechanism for severing travelling stock, comprising a base, a reciprocable carriage mounted thereon, a rotatable hollow shaft in said carriage surrounding the travelling stock, means for rotating said hollow shaft, a periodically actuated shearing knife mounted on said carriage, periodically actuated dies mounted on said carriage to engage said travelling stock, cooperating elements connecting said knife and dies, a prime mover to reciprocate said carriage, adjustable means to automatically control the operation of the prime mover, a motor, automatically controlled engaging devices to intermittently rotate the shaft by said motor, and braking means to bring said shaft to rest.

8. Flying shear mechanism for severing travelling stock, comprising a base, a reciprocable carriage mounted thereon, a rotatable hollow shaft in said carriage surrounding the travelling stock, means for rotating said hollow shaft, a prime mover, said prime mover located directly beneath the hollow shaft, a double acting piston in said prime mover, a piston rod, said piston rod connected to said carriage at a point approximately in line with the center of gravity of said carriage.

9. Flying shear mechanism for severing travelling stock, comprising a base, a reciprocable carriage mounted thereon, a hollow shaft in said carriage surrounding the travelling stock, a motor, a punch-press mechanism, a fly-wheel mounted to rotate about said shaft and driven by said motor, a driving collar secured to said shaft, means intermittently connecting said fly-wheel with said collar, and a crank and connecting rod driving said punch press mechanism from said shaft.

10. Flying shear mechanism for severing, travelling stock, comprising a base, a reciprocable carriage mounted thereon, a hollow shaft in said carriage surrounding the travelling stock, a motor, a punch-press mechanism, a fly-wheel mounted to rotate about said shaft and driven by said motor, a driving collar secured to said shaft, means intermittently connecting said fly-wheel with said collar, a crank and connecting rod driving said punch-press mechanism from said shaft, a braking mechanism, and adjustable means to automatically actuate said braking mechnism.

11. Flying shear mechanism for severing traveling stock, comprising a base, a reciprocable carriage mounted thereon, a rotatable hollow shaft in said carriage surrounding the travelling stock, means for rotating said hollow shaft, a periodically actuated shearing knife mounted on said carriage, periodically actuated dies mounted in said carriage to engage said travelling stock, cooperating elements connecting said knife and dies, a prime mover to reciprocate said carriage, adjustable means to automatically control the operation of the prime mover, and means to limit the travel of the carriage.

12. Flying shear mechanism for severing travelling stock, comprising a base, a reciprocable carriage mounted thereon, a rotatable hollow shaft in said carriage surrounding the travelling stock, a motor, a punch-press mechanism mounted on said carriage, a fly-wheel mounted to rotate about said shaft and driven by said motor, a driving collar secured to said shaft, means intermittently connecting said fly-wheel with said collar, a crank and connecting rod driving said punch-press mechanism from said shaft, said punch-press mechanism including a shearing knife, dies mounted on said carriage, cooperating elements connecting said knife and dies, a prime mover to reciprocate said carriage, adjustable means to automatically control the operation of the prime mover, means to actuate the dies to firmly engage the travelling stock and reciprocate the shearing knife and then disengage the dies while the carriage is travelling in one direction, and means to limit the travel of the carriage.

13. Flying shear mechanism for severing travelling stock, comprising a base, a reciprocable carriage mounted thereon, a rotatable hollow shaft in said carriage surrounding the travelling stock, means for rotating said hollow shaft, a prime mover, a punch-press mechanism mounted on said carriage, means to operate said punch press mechanism, means actuated by said travelling stock to start the prime mover, and means constituting a part of said carriage to firmly engage the travelling stock and thereby insure synchronism in travel between the carriage and travelling stock.

14. Flying shear mechanism for severing travelling stock, comprising a base, a reciprocable carriage mounted thereon, a rotatable hollow shaft in said carriage surrounding the travelling stock, means for rotating said hollow shaft, a prime mover, means connecting the prime mover with the carriage, means actuated by said travelling stock to start the prime mover, means actuated by said travelling carriage to stop and reverse said prime mover, and means to limit the distance travelled by the carriage.

15. Flying shear mechanism for severing travelling stock, comprising a base, a reciprocable carriage mounted thereon, a rotatable hollow shaft in said carriage surrounding the travelling stock, means for rotating said hollow shaft, a prime mover, means connecting the prime mover with the carriage, an electrically controlled valve to supply fluid to said prime mover, a switch actuated by the travelling stock to supply current to said electrically controlled valve, and means actuated by the travelling carriage to reverse said valve, and to supply fluid to actuate the prime mover in the opposite direction.

16. Flying shear mechanism for severing travelling stock, comprising a base, a reciprocable carriage mounted thereon, a hollow shaft in said carriage surrounding the travelling stock, a prime mover, means connecting the prime mover with the carriage, an electrically controlled valve to supply fluid to said prime mover, a switch actuated by the travelling stock to supply current to said valve and thereby start the prime mover and propel the carriage, a brake for said hollow shaft, means to release said brake, means to rotate said shaft, means to cut said travelling stock, means to apply said brake, and means to stop and reverse said prime mover.

17. Flying shear mechanism for severing travelling stock, comprising a base, a reciprocable carriage mounted thereon, a rotatable hollow shaft in said carriage surrounding the travelling stock, means for rotating said hollow shaft, a prime mover, means connecting the prime mover with the carriage, a punch press mechanism, a motor, automatic means to intermittently actuate said punch press by said motor, means actuated by said travelling stock to start the prime mover, means actuated by said travelling carriage to stop and reverse said prime mover, and means to limit the distance travelled by the carriage.

18. Flying shear mechanism for severing travelling stock, comprising a base, a reciprocable carriage mounted thereon, a rotatable hollow shaft in said carriage surrounding the travelling stock, means for rotating said hollow shaft, a prime mover, means connecting the prime mover with the carriage, a brake drum connected to the hollow shaft, a brake shoe, a compression means to apply said shoe to said drum, means to release said shoe from said drum, and adjustable means to actuate said releasing means.

19. Flying shear mechanism for severing travelling stock, comprising a base, a reciprocable carriage mounted thereon, a rotatable hollow shaft in said carriage surrounding said travelling stock, means for rotating said hollow shaft, a prime mover to operate said carriage, a brake drum secured to said shaft, brake shoes arranged to engage said brake drum, levers supporting said brake shoes, means to draw said levers together and thereby apply the brake shoes to the drum, a toggle joint connecting said levers, a latch to actuate said toggle joint, and an adjustable lug on said base to engage said latch during the travel of the carriage and actuate the toggle joint and separate the levers.

20. Flying shear mechanism for severing travelling stock, comprising a base, a reciprocable carriage mounted thereon, a rotatable hollow shaft in said carriage surrounding said travelling stock, a motor supported by said carriage, a fly wheel mounted for free rotation on said shaft, a driving collar secured to said shaft, a driving projection secured to said fly wheel and projecting toward said driving collar, a striker slidably mounted in said collar, and arranged when extended to engage said driving projection, and means to automatically withdraw said striker and thereby avoid engagement with said driving projection.

21. Flying shear mechanism for severing travelling stock, comprising a base, a reciprocable carriage mounted thereon, a rotatable hollow shaft mounted in said carriage surrounding said travelling stock, a motor supported by said carriage, a fly wheel mounted for free rotation on said shaft and arranged to be driven by said motor, a driving collar secured to said shaft, a driving projection secured to said fly wheel and projecting toward said driving collar, a striker slidably mounted in said collar and arranged when extended to engage said driving projection, means to normally hold the striker in an extended position, and thereby engage the driving projection and rotate the driving collar, and means actuated by the movement of the carriage to withdraw the striker from engagement with the driving projection.

22. Flying shear mechanism for severing travelling stock, comprising a base, a reciprocable carriage mounted thereon, a rotatable hollow shaft mounted in said carriage surrounding said travelling stock, a motor supported by said carriage, a fly wheel mounted for free rotation on said shaft and arranged to be driven by said motor, a driving collar secured to said shaft, a driving projection secured to said fly wheel and projecting toward said driving collar, a striker slidably mounted in said collar and arranged when extended to engage said driving projection, means to normally hold the striker in an extended position and thereby engage the driving projection and rotate the driving collar and the shaft, means actuated by the movement of the carriage to withdraw the striker from engagement with the driving projection at a predetermined point, braking means, and means to actuate the brake to stop the rotation of the shaft after the striker has been withdrawn from engagement with the driving projection.

23. Flying shear mechanism for severing travelling stock, comprising a base, a reciprocable carriage mounted thereon, a rotatable hollow shaft mounted in said carriage surrounding said travelling stock, a motor supported by said carriage, a punch-press mechanism mounted on said carriage, a fly-wheel mounted for free rotation on said shaft and arranged to be driven by said motor, a driving collar secured to said shaft, a driving projection secured to said fly wheel and projecting toward said driving collar, a striker slidably mounted in said collar and arranged when extended to engage said driving projection, means to normally hold the striker in an extended position and thereby engage the driving projection and rotate the driving collar and the shaft, a crank and connecting rod actuated by said shaft, said connecting rod connected to said punch press mechanism and arranged to operate the same, means actuated by the movement of the carriage to withdraw the striker from engagement with the driving projection at the end of a complete cycle of the punch press mechanism, braking means, and means to actuate the brake to stop the rotation of the shaft after the striker has been withdrawn from engagement with the driving projection.

24. Flying shear mechanism for severing travelling stock, comprising a base, a reciprocable carriage mounted thereon, a rotatable hollow shaft mounted in said carriage surrounding said travelling stock, a motor supported by said carriage, a punch press mechanism mounted on said carriage, a pair of dies mounted on said carriage and arranged to be operated by said punch press, a fly wheel mounted for free rotation on said shaft and arranged to be driven by said motor, a driving collar secured to said shaft, a driving projection secured to said fly wheel and projecting toward said driving collar, a striker slidably mounted in said collar and arranged when extended to engage said driving projection, means to normally hold the striker in an extended position and thereby engage the driving projection and rotate the driving collar and the shaft, a crank and connecting rod actuated by said shaft, said connecting rod connected to said punch press mechanism and arranged to operate the same, said punch press arranged to close said dies upon the travelling stock during a downward stroke and to open said dies upon an upward stroke, means actuated by the movement of the carriage to withdraw the striker from engagement with the driving projection at the end of a complete cycle of the punch press, braking means, and means to actuate the brake to stop the rotation of the shaft after the striker has been withdrawn from engagement with the driving projection.

25. Flying shear mechanism for severing travelling stock, comprising a base, a reciprocable carriage mounted thereon, a rotatable hollow shaft mounted in said carriage surrounding said travelling stock, a motor supported by said carriage, a punch press mechanism mounted on said carriage, a pair of dies mounted on said carriage and arranged to be operated by said punch press, a fly wheel mounted for free rotation on said shaft and arranged to be driven by said motor, a driving collar secured to said shaft, a driving projection secured to said fly wheel and projecting toward said driving collar, a striker slidably mounted in said collar and arranged when extended to engage said driving projection, means to normally hold the striker in an extended position and thereby engage the driving projection and rotate the driving collar and the shaft, a crank and connecting rod actuated by said shaft, said connecting rod connected to said punch press mechanism and arranged to operate the same, a prime mover to reciprocate said carriage, adjustable means actuated by the travelling stock to start the prime mover, adjustable means actuated by the moving carriage to stop and reverse the prime mover, said punch press arranged to close said dies upon the travelling stock during a downward stroke and to shear said stock, and to open said dies upon an upward stroke, means actuated by the movement of the carriage to withdraw the striker from engagement with the driving projection at the end of a complete cycle of the punch press, a braking means, and means to actuate the brake to stop the rotation of the shaft after the striker has been withdrawn from engagement with the driving projection, and means to discharge said stock after shearing.

26. Flying shear mechanism for severing travelling stock, comprising a base, a reciprocable carriage thereon, a rotatable hollow shaft mounted in said carriage surrounding said travelling stock, means for rotating said hollow shaft, a prime mover to reciprocate said carriage, an electrically actuated admission valve to supply compressed air to said prime mover, electric contact devices actuated by said travelling stock to close a circuit through said solenoid and supply air to one end of said prime mover and propel said carriage, adjustable means comprising a trip lever attached to said prime mover, adjustable means to actuate said trip lever, said adjustable means and trip lever arranged to shut off and release the air, and to supply air to the other end of the prime mover and reverse the movement of the carriage.

27. Flying shear mechanism for severing travelling stock, comprising a base, a reciprocable carriage mounted thereon, a rotatable hollow shaft mounted in said carriage surrounding said travelling stock, a motor supported by said carriage, said motor arranged to drive said shaft through automatic adjustable engaging mechanism, a prime mover to reciprocate said carriage, said prime mover located beneath and in the center line of said rotatable shaft, a valve, a solenoid to control said valve, electric contact devices, said contact devices arranged to be actuated by the movement of the travelling stock and to close a circuit through said solenoid and to supply compressed fluid to one end of said prime mover through said valve and propel said carriage, adjustable means comprising a trip lever attached to said prime mover, adjustable means to actuate said trip lever, said adjustable means and trip lever arranged to shut off the supply of compressed fluid to the prime mover and release the fluid, and to supply compressed fluid to the other end of said prime mover, and reverse the movement of said carriage.

28. Flying shear mechanism for severing travelling stock, comprising a base, a reciprocable carriage thereon, a rotatable hollow shaft mounted in said carriage surrounding said travelling stock, means for rotating said hollow shaft, a prime mover to reciprocate said carriage, electric devices to control a supply of compressed fluid to said prime mover, a spring controlled plunger switch arranged to close an electric circuit, said plunger constructed with a laminated anvil end, a slotted support for said laminations, said laminated end arranged to be pressed in and close the switch by the advancing end of the traveling stock, the laminations arranged to pass inside the slotted support, said slotted support provided with a beveled end and arranged to divert and dislodge the travelling stock.

29. Flying shear mechanism for severing travelling stock, comprising a base, a reciprocable carriage thereon, a rotatable hollow shaft mounted in said carriage surrounding said travelling stock, means for rotating said hollow shaft, a prime mover to reciprocate said carriage, electric devices to control a supply of compressed fluid to said prime mover, a shearing knife mounted on said carriage, an adjustable spring controlled plunger switch arranged to close an electric circuit through said devices, said plunger constructed with a laminated anvil end, a slotted support for said laminations, said laminated end arranged to be pressed in and close the switch by the advancing end of the travelling stock, the laminations arranged to pass inside the slotted support, said slotted support provided with a beveled end and arranged to divert and dislodge the travelling stock, said carriage and shearing knife arranged to be actuated and shear said stock after said plunger switch is closed.

30. Flying shear mechanism for severing travelling stock, comprising a base, a reciprocable carriage thereon, a rotatable hollow shaft mounted in said carriage surrounding said travelling stock, means for rotating said hollow shaft, a prime mover to reciprocate said carriage, electric devices to control a supply of compressed fluid to said prime mover, a shearing knife mounted on said carriage, an adjustable spring controlled plunger switch arranged to close an electric circuit through said devices, said plunger constructed with a laminated anvil end, a slotted support for said laminations, said laminated end arranged to be pressed in and close the switch by the advancing end of the travelling stock, the laminations arranged to pass inside the slotted support, said slotted support provided with a beveled end and arranged to divert and dislodge the travelling stock, said carriage and shearing knife arranged to be actuated and shear said stock after said plunger switch is closed, said plunger switch arranged to rebound and break the electric circuit through said devices after said travelling stock has been severed and dislodged.

31. Flying shear mechanism for severing travelling stock, comprising a base, a reciprocable carriage thereon, a rotatable hollow shaft mounted in said carriage surrounding said travelling stock, means for rotating said hollow shaft, means to shear said stock at predetermined intervals, adjustable means to control the shearing means, a plunger having a laminated anvil end, a slotted support for said laminations, the support having a beveled end, said plunger arranged to be pressed within said support by the travelling stock, and the stock to be dislodged by the beveled end of the support.

32. Flying shear mechanism for severing travelling stock, comprising a base, a reciprocable carriage mounted thereon, a hollow shaft in said carriage surrounding the travelling stock, a motor, a reciprocating punch mechanism adapted to sever the stock upon the power stroke of the reciprocating punch, a fly-wheel mounted to rotate about said shaft and driven by said motor, a driving collar secured to said shaft, means intermittently connecting said fly-wheel with said collar, and a crank and connecting rod driving said punch press mechanism from said shaft.

33. Flying shear mechanism for severing travelling stock, comprising a base, a reciprocable carriage mounted thereon, a rotatable hollow shaft in said carriage surrounding the travelling stock, means for rotating said hollow shaft, prime mover, a punch-press mechanism mounted on said carriage comprising a reciprocating punch adapted to sever the stock upon the power stroke of the punch reciprocating mechanism, means to operate said punch press mechanism, means actuated by said travelling stock to start the prime mover, and means constituting a part of said carriage to firmly engage the travelling stock and thereby insure synchronism in travel between the carriage and travelling stock.

34. Flying shear mechanism for severing travelling stock, comprising a base, a reciprocable carriage mounted thereon, a rotatable hollow shaft in said carriage surrounding the travelling stock, means for rotating said hollow shaft, a periodically actuated reciprocating punch adapted to sever the stock in a single reciprocation mounted on said carriage, periodically actuated dies mounted on said carriage to engage said travelling stock, and cooperating elements connecting said punch and dies.

35. Flying shear mechanism for severing travelling stock, comprising a base, a reciprocable carriage mounted thereon, a rotatable hollow shaft in said carriage surrounding the travelling stock, a periodically actuated reciprocating punch adapted to sever the stock in a single reciprocation mounted on said carriage, periodically actuated dies mounted on said carriage to engage said travelling stock, cooperating elements connecting said punch and dies; a prime mover to reciprocate said carriage, adjustable means to automatically control the operation of the prime mover, a motor, and automatically controlled engaging devices to intermittently rotate the shaft by said motor.

36. Flying shear mechanism for severing travelling stock, comprising a base, a reciprocable carriage mounted thereon, a rotatable hollow shaft in said carriage surrounding the travelling stock, means for rotating said hollow shaft, centering means adjacent the discharge end of the rotating shaft to maintain the travelling stock in axial alinement, a shearing knife periodically actuated mounted on said carriage at the discharge end of said hollow shaft, and periodically actuated dies mounted on said carriage to engage said travelling stock and thereby insure synchronism in travel of carriage and stock.

37. Flying shear mechanism for severing travelling stock, comprising a base, a reciprocable carriage mounted thereon, a rotatable hollow shaft in said carriage surrounding the travelling stock, means for rotating said hollow shaft, centering means adjacent the discharge end of the rotating shaft to maintain the travelling stock in axial alinement, a periodically actuated shearing knife mounted on said carriage, peperiodically actuated dies mounted on said carriage to engage said travelling stock, and cooperating elements connecting said knife and dies.

38. Flying shear mechanism for severing travelling stock, comprising a base, a reciprocable carriage mounted thereon, a rotatable hollow shaft in said carriage surrounding the travelling stock, means for rotating said hollow shaft, centering means adjacent the discharge end of the rotating shaft to maintain the travelling stock in axial alinement, a periodically actuated shearing knife mounted on said carriage, periodically actuated dies mounted on said carriage to engage said travelling stock, cooperating elements connecting said knife and dies, and a prime mover to reciprocate said carriage.

39. Flying shear mechanism for severing travelling stock, comprising a base, a reciprocable carriage mounted thereon, a rotatable hollow shaft in said carriage surrounding the travelling stock, means for rotating said hollow shaft, centering means adjacent the discharge end of the rotating shaft to maintain the travelling stock in axial alinement, a periodically actuated shearing knife mounted on said carriage, periodically actuated dies mounted on said carriage to engage said travelling stock, cooperating elements connecting said knife and dies, a prime mover to reciprocate said carriage, adjustable means to automatically control the operation of the prime mover, and a motor to actuate said shearing knife.

40. Flying shear mechanism for severing travelling stock, comprising a base, a reciprocable carriage mounted thereon, a rotatable hollow shaft in said carriage surrounding the travelling stock, centering means adjacent the discharge end of the rotating shaft to maintain the travelling stock in axial alinement, a periodically actuated shearing knife mounted on said carriage, periodically actuated dies mounted on said carriage to engage said travelling stock, co-operating elements connecting said knife and dies, a prime mover to reciprocate said carriage, adjustable means to automatically control the operation of the prime mover, a motor, automatically controlled engaging devices to intermittently rotate the shaft by said motor, and braking means to bring said shaft to rest.

41. Flying shear mechanism for severing travelling stock, comprising a base, a reciprocable carriage mounted thereon, a rotatable hollow shaft in said carriage surrounding the travelling stock, means for rotating said hollow shaft, centering means adjacent the discharge end of the rotating shaft to maintain the travelling stock in axial alinement, a periodically actuated shearing knife mounted on said carriage, periodically actuated dies mounted in said carriage to engage said travelling stock, co-operating elements connecting said knife and dies, a prime mover to reciprocate said cariage, adjustable means to automatically control the operation of the prime mover, and means to limit the travel of the carriage.

42. Flying shear mechanism for severing travelling stock, comprising a base, a reciprocable carriage thereon, a rotatable hollow shaft mounted in said carriage surrounding said travelling stock, means for rotating said hollow shaft, centering means adjacent the discharge end of the rotating shaft to maintain the travelling stock in axial alinement, means to shear said stock at predetermined intervals, adjustable means to control the shearing means, a plunger having a laminated anvil end, a slotted support for said laminations, the support having a beveled end, said plunger arranged to be pressed within said support by the travelling stock, and the stock to be dislodged by the beveled end of the support.

43. Flying shear mechanism for severing travelling stock, comprising a base, a reciprocable carriage mounted thereon, a rotatable hollow shaft in said carriage surrounding the travelling stock, means for rotating said hollow shaft, stock severing means mounted on said carriage and adapted to move across the path of movement of said stock to sever said stock and means connecting said hollow shaft and said stock severing means whereby rotation of said shaft causes said stock severing means to sever said stock.

44. Flying shear mechanism for severing travelling stock, comprising a base, a reciprocable carriage mounted thereon, a rotatable hollow shaft in said carriage surrounding said travelling stock, means for rotating said hollow shaft, periodically actuated dies mounted on said carriage to engage said travelling stock, stock severing means mounted on said carriage and adapted to move across the path of movement of and sever said stock, means connecting said hollow shaft and said stock severing means whereby the rotation of said shaft causes said stock severing means to move and sever said stock.

45. Flying shear mechanism for severing travelling stock, comprising a base, a reciprocable carriage mounted thereon, a rotatable hollow shaft in said carriage surrounding said travelling stock, means for rotating said hollow shaft, periodically actuated dies mounted on said carriage to engage said travelling stock, stock severing means comprising a blade mounted on said carriage and adapted to move said blade across the path of movement of and sever said stock, means connecting said hollow shaft and said stock severing means whereby the rotation of said shaft causes said dies to engage said stock and also causes said blade to move and sever said stock.

46. Flying shear mechanism for severing travelling stock, comprising a base, a reciprocable carriage mounted thereon, a rotatable hollow shaft in said carriage surrounding said travelling stock, means for rotating said hollow shaft, periodically actuated dies mounted on said carriage to engage said travelling stock, stock severing means comprising a blade mounted on said carriage and adapted to move said blade across the path of movement of and sever said stock, co-operating elements connecting said stock severing means and dies, means connecting said hollow shaft and said stock severing means, whereby the rotation of said shaft causes said dies to engage said stock and also causes said blade to move and sever said stock.

47. Flying shear mechanism for severing travelling stock, comprising a base, a reciprocable carriage mounted thereon, a rotatable hollow shaft in said carriage surrounding said travelling stock, means for rotating said hollow shaft, centering means adjacent the discharge end of the rotating shaft to maintain the travelling stock in axial alinement, periodically actuated dies mounted on said carriage to engage said travelling stock, stock severing means comprising a reciprocating blade mounted on said carriage and adapted to move said blade across the path of movement of and sever said stock, co-operating elements connecting said stock severing means and dies, means connecting said hollow shaft and said stock severing means, whereby the rotation of said shaft causes said dies to engage said stock and also causes said blade to move and sever said stock, and braking means to bring said rotating shaft to rest.

48. Flying shear mechanism for severing travelling stock, comprising a base, a reciprocable carriage mounted thereon, a rotatable hollow shaft in said carriage surrounding said travelling stock, means for rotating said hollow shaft, centering means adjacent the discharge end of the rotating shaft to maintain the travelling stock in axial alinement, periodically actuated dies mounted on said carriage to engage said travelling stock, stock severing means comprising a reciprocating blade mounted on said carriage and adapted to move said blade across the path of movement of and sever said stock, co-operating elements connecting said stock severing means and dies, means connecting said hollow shaft and said stock severing means whereby the rotation of said shaft causes said dies to engage said stock and also causes said blade to move and sever said stock, a plunger having a laminated anvil end, a slotted support for said laminations, said support having a beveled end, said plunger arranged to be pressed within said support by the travelling stock, and the severed stock dislodged by the beveled end of the support, and braking means to bring said rotating shaft to rest.

FRANK L. SESSIONS.